(12) United States Patent
Li et al.

(10) Patent No.: US 11,586,469 B2
(45) Date of Patent: Feb. 21, 2023

(54) METHOD, DEVICE AND STORAGE MEDIUM FOR PROCESSING OVERHEAD OF MEMORY ACCESS

(71) Applicant: Beijing Xiaomi Mobile Software Co., Ltd., Beijing (CN)

(72) Inventors: Yin Li, Beijing (CN); Liangliang He, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 418 days.

(21) Appl. No.: 16/742,102

(22) Filed: Jan. 14, 2020

(65) Prior Publication Data
US 2021/0117199 A1 Apr. 22, 2021

(30) Foreign Application Priority Data

Oct. 17, 2019 (CN) .......................... 201910989917.1

(51) Int. Cl.
| | |
|---|---|
| *G06F 9/50* | (2006.01) |
| *G06N 20/00* | (2019.01) |
| *G06F 9/30* | (2018.01) |
| *G06N 3/063* | (2023.01) |
| *G06N 3/10* | (2006.01) |
| *G06N 3/04* | (2023.01) |
| *G06F 17/15* | (2006.01) |

(52) U.S. Cl.
CPC .......... *G06F 9/5016* (2013.01); *G06F 9/3004* (2013.01); *G06F 17/15* (2013.01); *G06N 3/0454* (2013.01); *G06N 3/063* (2013.01); *G06N 3/10* (2013.01); *G06N 20/00* (2019.01)

(58) Field of Classification Search
CPC ....... G06F 9/5016; G06F 17/15; G06N 20/00; G06N 3/0454; G06N 3/063; G06N 3/10
USPC .......................................................... 706/27
See application file for complete search history.

(56) References Cited

U.S. PATENT DOCUMENTS

| | | | |
|---|---|---|---|
| 2017/0148431 A1 | 5/2017 | Catanzaro et al. | |
| 2018/0088996 A1 | 3/2018 | Rossi et al. | |
| 2018/0129893 A1* | 5/2018 | Son ........................ | G06V 10/95 |

(Continued)

FOREIGN PATENT DOCUMENTS

| | | |
|---|---|---|
| CN | 106156807 A | 11/2016 |
| CN | 106339983 A | 1/2017 |

(Continued)

OTHER PUBLICATIONS

Turner, J. et al., Characterising Across-Stack Optimisations for Deep Convolutional Neural Networks, 2018 IEEE International Symposium on Workload Characterization (IISWC), IEEE, Sep. 30, 2018, 10 pages.

(Continued)

*Primary Examiner* — Than Nguyen
(74) *Attorney, Agent, or Firm* — Finnegan, Henderson, Farabow, Garrett & Dunner, L.L.P.

(57) ABSTRACT

A method for processing overhead of memory access includes: applying for a memory configured to perform value padding on at least one convolution operation in a deep learning model; determining input data of the deep learning model; performing deep learning processing on the input data by using the deep learning model; and releasing the memory after performing the deep learning processing.

6 Claims, 8 Drawing Sheets

(56) References Cited

U.S. PATENT DOCUMENTS

| | | | |
|---|---|---|---|
| 2018/0136912 A1* | 5/2018 | Venkataramani | G06N 3/04 |
| 2019/0197420 A1* | 6/2019 | Singh | G06N 3/082 |
| 2019/0303025 A1 | 10/2019 | Sekiyama et al. | |
| 2020/0394500 A1* | 12/2020 | Hill | G06F 17/15 |

FOREIGN PATENT DOCUMENTS

| | | |
|---|---|---|
| CN | 106709441 A | 5/2017 |
| CN | 108304788 A | 7/2018 |
| CN | 109583576 A | 4/2019 |
| CN | 110088777 A | 8/2019 |

OTHER PUBLICATIONS

Hu, Y. et al., BitFlow: Exploiting Vector Parallelism for Binary Neural Networks on CPU, 2018 IEEE International Parallel and Distributed Processing Symposium (IPDPS), IEEE, May 21, 2018, 10 pages.

European Search Report in the European Application No. 20151645.7, dated Jul. 8, 2020.

First Office Action of Chinese Application No. 201910989917.1, dated Nov. 1, 2021.

Liu Zhongli etc., "Segmentation of Spine CT Image Based on Deep Learning", Computer Applications and Software, Oct. 2018.

Koichi Shirahata etc., "Memory reduction method for deep neural network training" 2016 IEEE International Workshop on Machine Learning for Signal Processing, Sep. 13-16, 2016, Salerno, Italy.

Notification to Grant Patent Right for Invention for Chinese Patent Application No. 201910989917.1, dated Nov. 9, 2022.

\* cited by examiner

METHOD, DEVICE AND STORAGE MEDIUM FOR PROCESSING OVERHEAD OF MEMORY ACCESS

CROSS-REFERENCE TO RELATED APPLICATION

This application is based upon and claims priority to Chinese Patent Application 201910989917.1 filed on Oct. 17, 2019, the entire contents of which are incorporated herein by reference.

TECHNICAL FIELD

The disclosure relates to the technical field of multimedia data processing, and particularly to a method, a device and a storage medium for processing overhead of memory access.

BACKGROUND

A deep learning model is an important technology for artificial intelligence in an image field. With smart phones and Internet of Things (IoT) devices becoming popular, more and more deep learning algorithms have been applied to terminal devices. Although the calculation and storage capabilities of terminal devices are gradually improved, resources are still very limited due to restriction of the size and power of the terminal devices.

When a deep learning algorithm is executed, input data can be subjected to padding and then subjected to convolution to prevent data at marginal parts from being lost.

SUMMARY

According to a first aspect of the present disclosure, a method for processing overhead of memory access includes: applying for a memory configured to perform value padding on at least one convolution operation in a deep learning model; determining input data of the deep learning model; performing deep learning processing on the input data by using the deep learning model; and releasing the memory after performing the deep learning processing.

According to a second aspect of the present disclosure, a device for processing overhead of memory access includes: a processor; and a memory for storing instructions executable by the processor; wherein the processor is configured to: apply for a memory configured to perform value padding on at least one convolution operation in a deep learning model; determine input data of the deep learning model; perform deep learning processing on the input data by using the deep learning model; and release the memory after performing the deep learning processing.

According to a third aspect of the present disclosure, a non-transitory computer-readable storage medium has stored therein instructions that, when executed by a processor of a device, cause the device to perform a method for processing overhead of memory access. The method includes: applying for a memory configured to perform value padding on at least one convolution operation in a deep learning model; determining input data of the deep learning model; performing deep learning processing on the input data by using the deep learning model; and releasing the memory after performing the deep learning processing.

It is to be understood that the above general description and the following detailed description are merely exemplary and explanatory, but do not limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

It is to be understood that "first," "second" and similar terms used in the specification and claims are not to represent any sequence, number or importance but only to distinguish different parts. Likewise, similar terms such as "a" or "an" also do not represent a number limit but represent "at least one". It is also to be understood that term "and/or" used in the present disclosure refers to and includes one or any or all possible combinations of multiple associated items that are listed.

In some embodiments, in a deep learning process, a memory can be temporarily created when each convolution operation is calculated, original input data may be copied in the memory, space can be reserved for padding, the convolution operation can be performed, a result can be output, and after the convolution operation is ended, the temporary memory can be released. In this way, the creation and release of the memory for each operation may bring great performance overhead. If the memory is not released, it may also bring high memory consumption.

A deep learning process in the present disclosure can be employed to process multiple types of data, such as image data, or other types of two-dimensional multimedia data, such as two-dimensional voice data.

Figure 1:
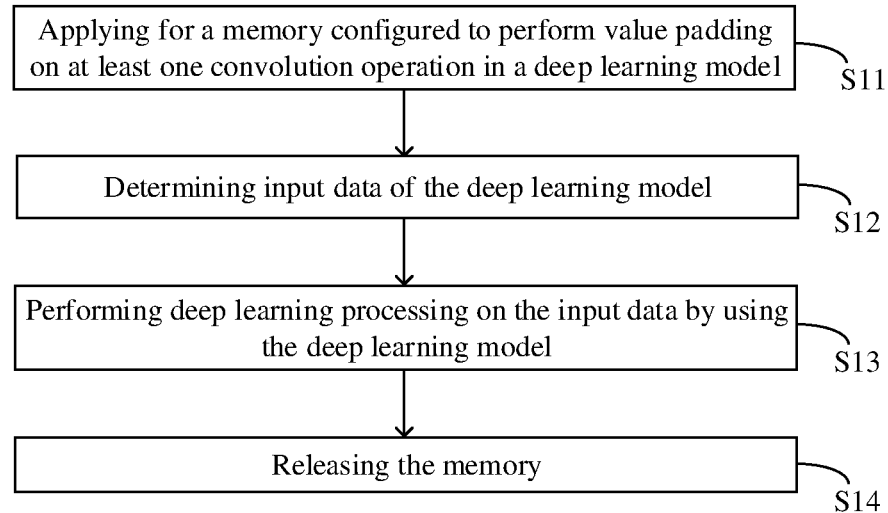
FIG. 1 is a flowchart of a method for processing overhead of memory access according to an exemplary embodiment.

FIG. 1 is a flowchart of a method for processing overhead of memory access according to an exemplary embodiment. As shown in FIG. 1, the method includes the following operations.

In operation S11, a memory configured to perform value padding on at least one convolution operation in a deep learning model is applied for.

In operation S12, input data of the deep learning model is determined.

In operation S13, deep learning processing is performed on the input data by using the deep learning model.

In operation S14, the memory is released.

In an embodiment, the deep learning algorithm may include N convolution operations which are set in sequence, and N is an integer greater than 1. The deep learning algorithm may correspond to a deep learning model, and the deep learning model may accordingly include N convolution layers in a logical structure. For two adjacent convolution layers, the output data of a first convolution layer may be the input data of a second convolution layer, and the two adjacent convolution layers may have a dependency relationship.

In the method, the memories for padding can be preset in advance and can be uniformly released after the deep learning algorithm is completed, thereby reducing the processes of applying for and releasing the memories, and saving the processing capability.

Figure 2:
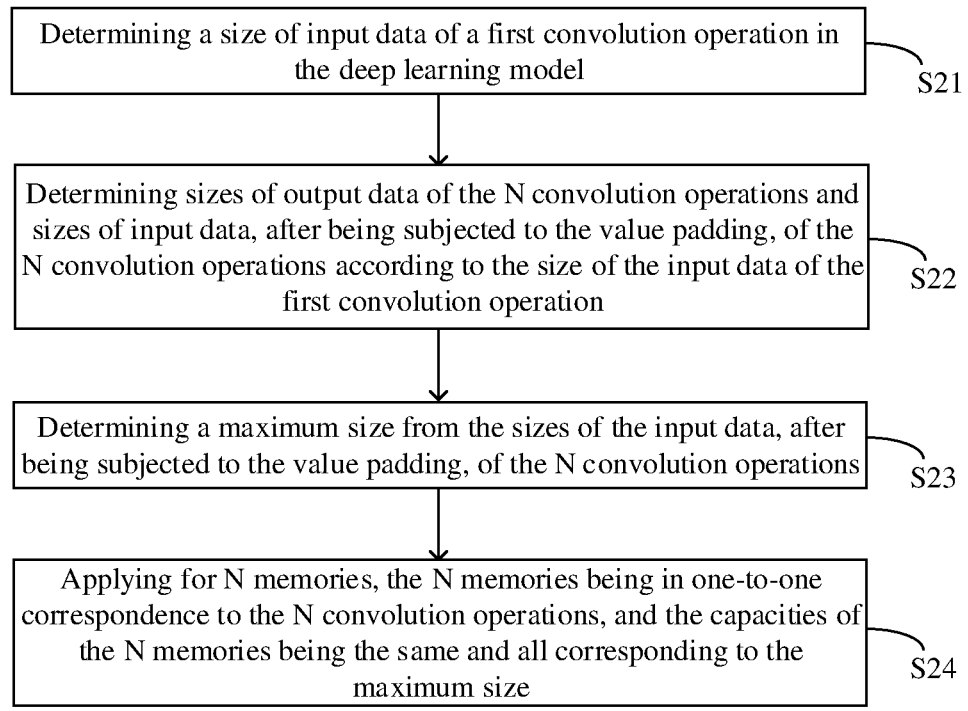
FIG. 2 is a flowchart of an operation in a method for processing overhead of memory access according to an exemplary embodiment.

In the present embodiment, a fixed memory can be disposed in advance. FIG. 2 is a flowchart of a method for processing overhead of memory access according to an exemplary embodiment. As shown in FIG. 2, operation S11 in FIG. 1 may include the following operations:

In operation S21, a size of input data of a first convolution operation in the deep learning model is determined.

In operation S22, sizes of output data of the N convolution operations and sizes of input data, after being subjected to the value padding, of the N convolution operations are determined according to the size of the input data of the first convolution operation.

In operation S23, a maximum size is determined from the sizes of the input data, after being subjected to the value padding, of the N convolution operations.

In operation S24, N memories are applied, the N memories being in one-to-one correspondence to the N convolution operations, and the capacities of the N memories being the same and all corresponding to the maximum size.

In the applied N memories in the operation S24, the data stored in each storage cell of each memory can be a default value, such as 0. In this way, it is equivalent to automatically performing padding in each layer of convolution operation.

The operation of performing deep learning processing on the input data by using the deep learning model in S13 in FIG. 1 may also include that: prior to performing each convolution operation, the value padding is performed on input data of the each convolution operation by using each memory corresponding to the each convolution operation.

In the embodiment, a maximum size can be determined from the sizes of the data, after being subjected to padding, of the N convolution operations, a memory with a same size as the maximum size can be set for each convolution operation, and after the deep learning algorithm is completed, all memories can be uniformly released. Compared with a mode of applying for a temporary memory for each convolution operation and releasing the temporary memory after the convolution operation is completed, the processing capability can be saved.

Specific examples are provided for illustration below.

Example 1

A deep learning algorithm may include eight convolution operations. The input data of a first convolution operation may be data of one frame of image, and the size of the input data may be 1920×1080, that is, the number of horizontal pixels of this frame of image is 1920, and the number of longitudinal pixels is 1080. The size of the input data of each convolution operation can be 1920×1080, and the size of the data, after being subjected to padding, of each corresponding convolution operation can be 1922×1082. Eight memories may be arranged, the initial value of each storage cell in the memories may be 0, each memory may correspond to a convolution operation, and the capacity of each memory can be 1922×1082 storage units. In a case that processing data is an integer, the storage units may be bytes. In a case that the processing data is a floating point number, the storage units may be four bytes.

Example 2

A deep learning algorithm may include eight convolution operations. The input data of a first convolution operation may be data of one frame of image, and the size of the input data may be 1920×1080. The sizes of the input data of the eight convolution operations may sequentially be: 1920×1080, 1680×960, 1470×840, . . . , 240×135. The sizes of the data, after being subjected to padding, of the eight convolution operations may sequentially be: 1922×1082, 1682×962, 1472×842, 242×132. The maximum size may be determined to be 1922×1082. Eight memories may be arranged, the initial value of each storage cell in the memories may be 0, and the capacity of each memory may be 1922×1082 storage units.

Figure 3:
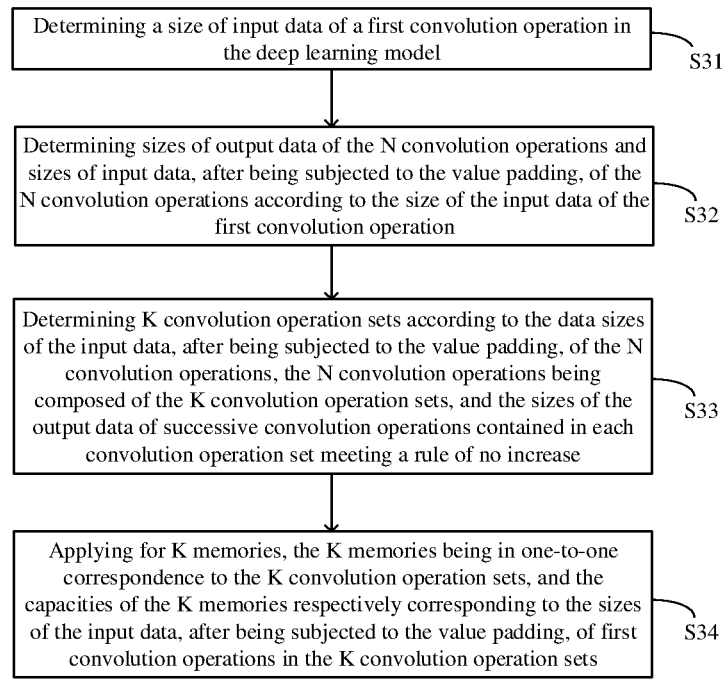
FIG. 3 is a flowchart of an operation a method for processing overhead of memory access according to an exemplary embodiment.

FIG. 3 is a flowchart of a method for processing overhead of memory access according to an exemplary embodiment. In the embodiment, fixed memories may be arranged in advance. As shown in FIG. 3, operation S11 in FIG. 1 may include the following operations.

In operation S31, a size of input data of a first convolution operation in the deep learning model is determined.

In operation S32, sizes of output data of the N convolution operations and sizes of input data, after being subjected to the value padding, of the N convolution operations are determined according to the size of the input data of the first convolution operation.

In operation S33, K convolution operation sets are determined according to the data sizes of the input data, after being subjected to the value padding, of the N convolution operations, the N convolution operations being composed of the K convolution operation sets, and the sizes of the output data of successive convolution operations contained in each convolution operation set meeting a rule of no increase.

In operation S34, K memories are applied for, the K memories being in one-to-one correspondence to the K convolution operation sets, the capacities of the K memories corresponding to the sizes of the input data, after being subjected to the value padding, of first convolution operations in the K convolution operation sets, respectively, and K being an integer smaller than N.

The operation of performing deep learning processing on the input data by using the deep learning model in S13 in FIG. 1 may also include that: prior to performing each convolution operation, the value padding is performed on the input data of the each convolution operation by using each memory corresponding to each convolution operation set to which the each convolution operation belongs.

In the present embodiment, a plurality of convolution operations forming certain rules may share a memory, thereby saving the memory overhead.

Specific examples are provided for illustration below.

A deep learning algorithm may include eight convolution operations. The input data of a first convolution operation may be data of one frame of image, and the size of the input data may be 1920×1080.

The sizes of the input data of the eight convolution operations may sequentially be: 1920×1080, 960×540, 480× 270, 960×540, 480×270, 240×135, 1920×1080, 960×540.

The sizes of the data of the eight convolution operations after padding are may sequentially be: 1922×1082, 962× 542, 482×272, 962×542, 482×272, 242×137, 1922×1082, 962×542.

Three convolution sets can be determined according to the sizes of the data, after being subjected to padding, of the eight convolution operations; a first convolution operation set may include a first convolution operation, a second convolution operation and a third convolution operation; a second convolution operation set may include a fourth convolution operation, a fifth convolution operation and a sixth convolution operation; and a third convolution operation set may include a seventh convolution operation and an eighth convolution operation. The sizes of the output data of a plurality of convolution operations, arranged in sequence, contained in each convolution operation set can meet the rule of no increase.

Three memories, including a first memory, a second memory and a third memory, may be applied, the capacities of the three memories may correspond to the sizes of the data, after being subjected to padding, of the first convolution operation in the three convolution operation sets, the capacity of the first memory may be 1922×1082 storage units, the capacity of the second memory may be 962×542 storage units, and the capacity of the third memory may be 1922×1082 storage units.

During execution of the deep learning algorithm, when the first convolution operation, the second convolution operation and the third convolution operation are performed, the first memory can be used; when the fourth convolution operation, the fifth convolution operation and the sixth convolution operation are performed, the second memory can be used; and when the seventh convolution operation and the eighth convolution operation are performed, the third memory can be used.

Figure 4:
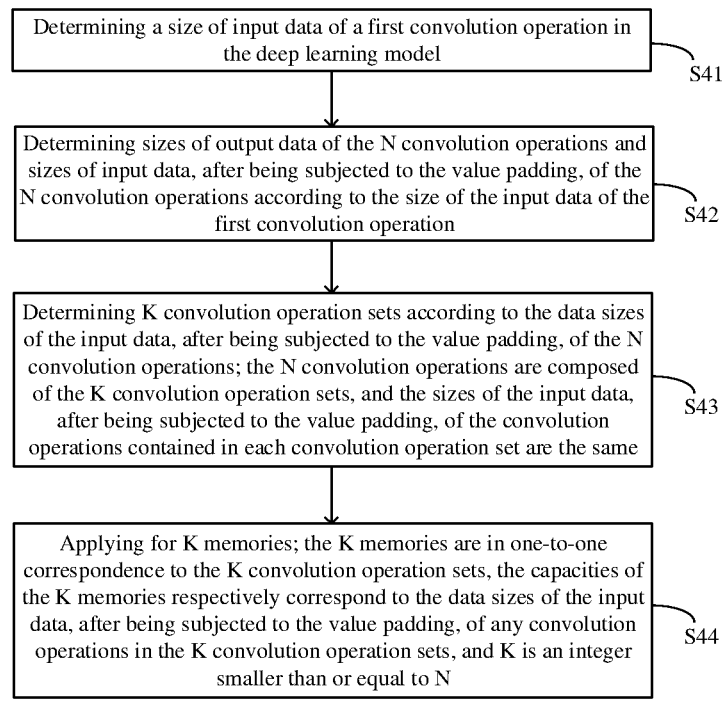
FIG. 4 is a flowchart of an operation a method for processing overhead of memory access according to an exemplary embodiment.

FIG. 4 is a flowchart of a method for processing overhead of memory access according to an exemplary embodiment. In the embodiment, fixed memories can be arranged in advance. As shown in FIG. 4, operation S11 in FIG. 1 may include the following operations.

In operation S41, a size of input data of a first convolution operation in the deep learning model is determined.

In operation S42, sizes of output data of the N convolution operations and sizes of input data, after being subjected to the value padding, of the N convolution operations are determined according to the size of the input data of the first convolution operation.

In operation S43, K convolution operation sets are determined according to the data sizes of the input data, after being subjected to the value padding, of the N convolution operations; the N convolution operations are composed of the K convolution operation sets, and the sizes of the input data, after being subjected to the value padding, of the convolution operations contained in each convolution operation set are the same.

In operation S44, K memories are applied for; the K memories are in one-to-one correspondence to the K convolution operation sets, the capacities of the K memories correspond to the data sizes of the input data, after being subjected to the value padding, of any convolution operations in the K convolution operation sets, respectively, and K is an integer smaller than or equal to N.

The operation of performing deep learning processing on the input data by using the deep learning model in S13 in FIG. 1 may include that: prior to performing each convolution operation, the value padding is performed on the input data of each convolution operation by using each memory corresponding to each convolution operation set to which the each convolution operation belongs.

In the present embodiment, a plurality of convolution operations with the same size of data after being subjected to padding may share a memory, thereby saving the memory overhead.

Specific examples are provided for illustration below.

A deep learning algorithm may include eight convolution operations. The input data of a first convolution operation may be data of one frame of image, and the size of the input data may be 1920×1080.

The sizes of the input data of the eight convolution operations may sequentially be: 1920×1080, 960×540, 1920×1080, 960×540, 1920×1080, 960×540, 1920×1080, 960×540.

The sizes of the data, after being subjected to padding, of the eight convolution operations may sequentially be: 1922× 1082, 962×542, 1922×1082, 962×542, 1922×1082, 962× 542, 1922×1082, 962×542.

Two convolution sets may be determined according to the sizes of the data of the eight convolution operations after padding; a first convolution operation set may include a first convolution operation, a third convolution operation, a fifth convolution operation and a seventh convolution operation; and a second convolution operation set may include a second convolution operation, a fourth convolution operation, a sixth convolution operation and an eighth convolution operation.

Two memories, including a first memory and a second memory, may be applied for, the capacities of the two memories may correspond to the sizes of the data of the convolution operations in the two convolution operation sets after padding, the capacity of the first memory is 1922×1082 storage units, and the capacity of the second memory is 962×542 storage units.

During execution of the deep learning algorithm, when the first convolution operation, the third convolution operation, the fifth convolution operation and the seventh convolution operation are performed, the first memory can be used; and when the second convolution operation, the fourth convolution operation, the sixth convolution operation and the eighth convolution operation are performed, the second memory can be used.

An embodiment of the present disclosure provides another method for processing overhead of memory access. In the embodiment, a memory capable of being dynamically adjusted during a convolution operation can be arranged.

The memory configured to perform the value padding on at least one convolution operation in the deep learning model, applied in operation S11 in FIG. 1, may be a shared memory.

The operation of performing deep learning processing on the input data by the deep learning model in S13 in FIG. 1 may also include that: the capacity of the shared memory is adjusted for a convolution operation requiring value padding so as to enable the adjusted capacity of the shared memory to correspond to the size of the input data, after being subjected to the value padding, of the convolution operation requiring the value padding, and performing value padding on the input data of the convolution operation by using the shared memory.

In the embodiment, during a convolution operation, the shared memory can be dynamically adjusted, that is, the capacity of the shared memory can be increased or reduced, therefore, the memory can be used reasonably according to needs, and the memory will not be wasted.

An embodiment of the present disclosure provides another method for processing overhead of memory access. In the embodiment, a memory which can be dynamically adjusted when a convolution operation meets certain conditions can be set on the basis of the above embodiments.

The memory configured to perform the value padding on at least one convolution operation in the deep learning model, applied in operation S11 in FIG. 1, may be a shared memory.

The operation of adjusting the capacity of the shared memory for a convolution operation requiring value padding in S13 may include that: for the convolution operation requiring the value padding, a size of the input data of the convolution operation requiring the value padding after the value padding is performed is determined; and responsive to that the capacity corresponding to the size of the input data of the convolution operation requiring the value padding after value padding is performed is greater than the capacity of the shared memory, the capacity of the shared memory is reconfigured to be the capacity corresponding to the size of the input data of the convolution operation requiring the value padding after the value padding is performed.

In the present embodiment, during a convolution operation, the shared memory can be dynamically adjusted, and the capacity of the shared memory is adjusted to be increased only when the capacity corresponding to the size of the output data of the convolution operation is greater than the capacity of the shared memory. Compared with the above embodiment, this method can reduce the frequency of adjusting the shared memory, thereby saving the processing capability.

Figure 5:
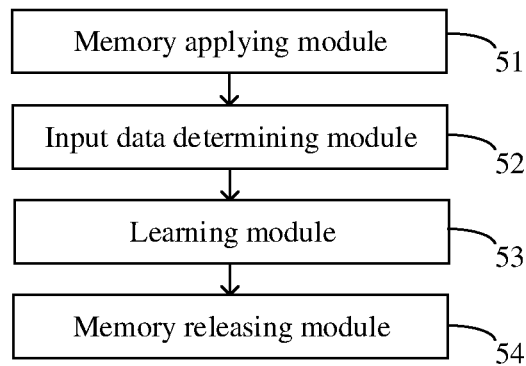
FIG. 5 is a block diagram of a device for processing overhead of memory access according to an exemplary embodiment.

FIG. 5 is a block diagram of a device for processing overhead of memory access according to an exemplary embodiment. As shown in FIG. 5, the device includes: a memory applying module 51 configured to apply for a memory configured to perform value padding on at least one convolution operation in a deep learning model; an input data determining module 52 configured to determine input data of the deep learning model; a learning module 53 configured to perform deep learning processing on the input data by using the deep learning model; and a memory releasing module 54 configured to release the memory.

The deep learning algorithm may include N convolution operations with a preset execution sequence, and N is an integer greater than 1.

In the implementation of the device, memories for padding can be preset in advance and can be uniformly released after the deep learning algorithm is completed, thereby reducing the processes of applying for and releasing the memories, and saving the processing capability.

Figure 6:
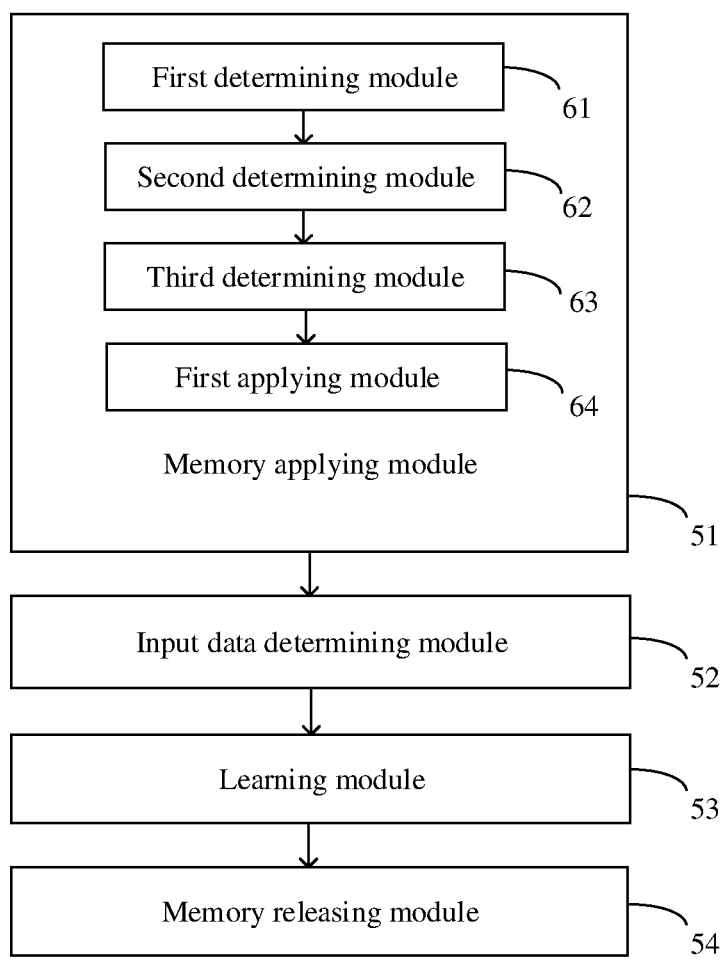
FIG. 6 is a block diagram of a memory applying module in a device for processing overhead of memory access according to an exemplary embodiment.

FIG. 6 is a block diagram of a device for processing overhead of memory access according to an exemplary embodiment. As shown in FIG. 6, the memory applying module 51 may include: a first determining module 61 configured to determine a size of input data of a first convolution operation in the deep learning model; a second determining module 62 configured to determine, according to the size of the input data of the first convolution operation, sizes of output data of the N convolution operations and sizes of input data, after being subjected to the value padding, of the N convolution operations; a third determining module 63 configured to determine a maximum size from the sizes of the input data, after being subjected to the value padding, of the N convolution operations; a first applying module 64 configured to apply for N memories, wherein the N memories are in one-to-one correspondence to the N convolution operations, and capacities of the N memories are the same and all correspond to the maximum size. The learning module 53 is further configured to, prior to performing each convolution operation, perform the value padding on input data of the each convolution operation by using each memory corresponding to the each convolution operation.

In the implementation of the device, a maximum size can be determined from the sizes of the data of the N convolution operations after padding, a memory with a same size as the maximum size can be set for each convolution operation, and after the deep learning algorithm is completed, all memories can be uniformly released. Compared with a mode of applying for a temporary memory for each convolution operation and releasing the temporary memory after the convolution operation is completed, the processing capability can be saved.

Figure 7:
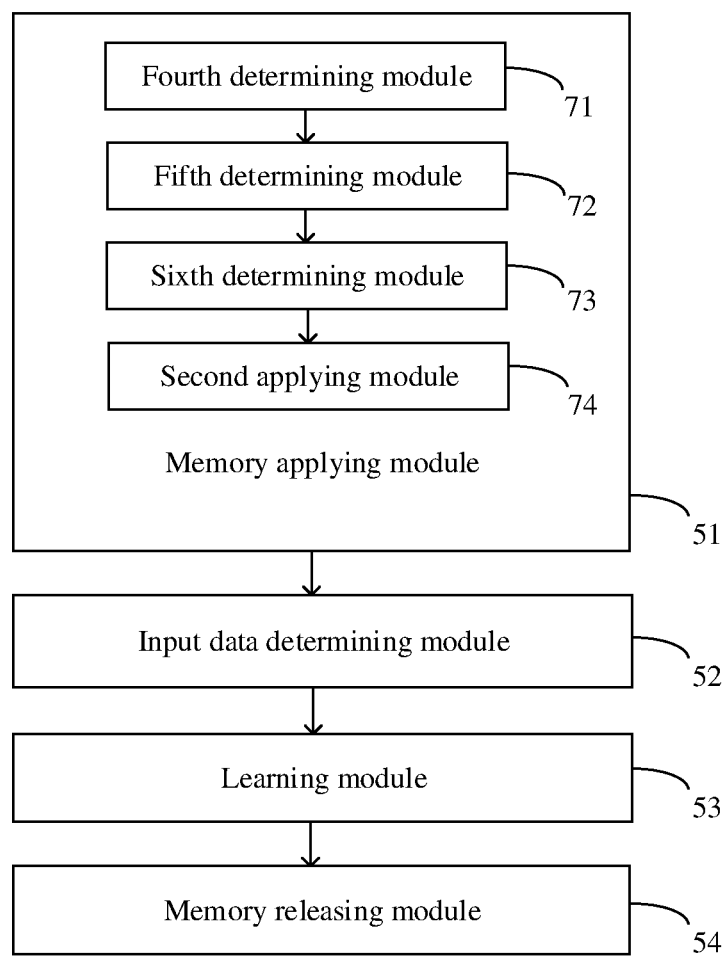
FIG. 7 is a block diagram of a memory applying module in a device for processing overhead of memory access according to an exemplary embodiment.

FIG. 7 is a block diagram of a device for processing overhead of memory access according to an exemplary embodiment. As shown in FIG. 7, the memory applying module 51 may include: a fourth determining module 71 configured to determine a size of input data of a first convolution operation in the deep learning model; a fifth determining module 72 configured to determine, according to the size of the input data of the first convolution operation, sizes of output data of the N convolution operations and sizes of input data, after being subjected to the value padding, of the N convolution operations; a sixth determining module 73 configured to determine K convolution operation sets according to the data sizes of the input data, after being subjected to the value padding, of the N convolution operations, wherein the N convolution operations are composed of the K convolution operation sets, and sizes of output data of successive convolution operations contained in each convolution operation set meet a rule of no increase; a second applying module 74 configured to apply for K memories, wherein the K memories are in one-to-one correspondence to the K convolution operation sets, capacities of the K memories respectively correspond to the size of the input data, after being subjected to the value padding, of the first convolution operation in the K convolution operation sets, and K is an integer smaller than N. The learning module 53 is further configured to: prior to performing each convolution operation, perform the value padding on input data of the each convolution operation by using each memory corresponding to each convolution operation set to which the each convolution operation belongs.

In the implementation of the device, a plurality of convolution operations forming certain rules may share a memory, thereby saving the memory overhead.

Figure 8:
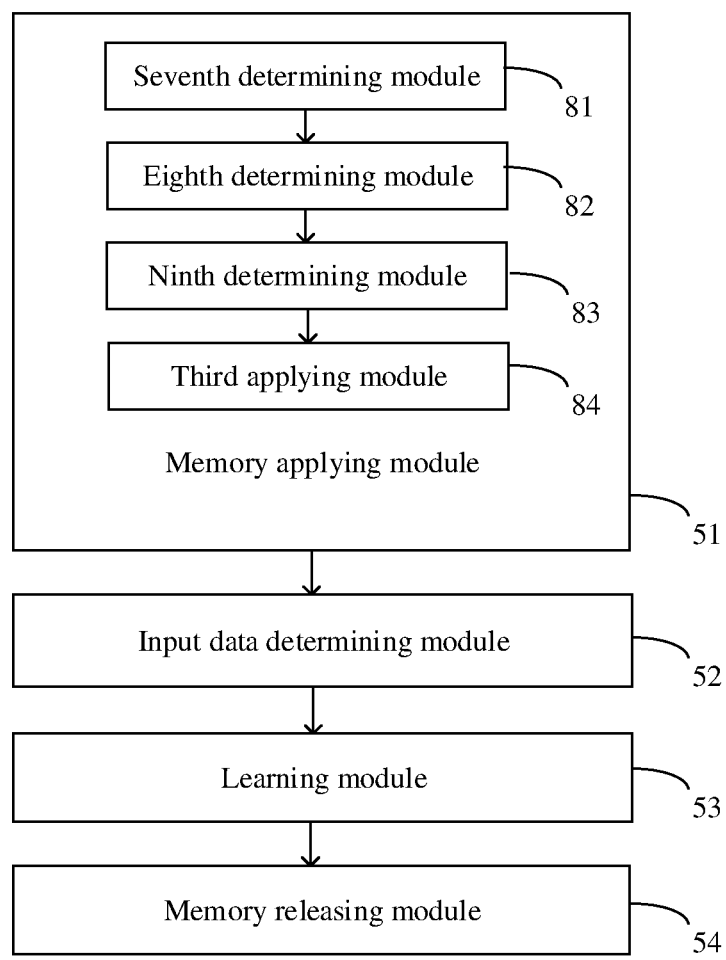
FIG. 8 is a block diagram of a memory applying module in a device for processing overhead of memory access according to an exemplary embodiment.

FIG. 8 is a block diagram of a device for processing overhead of memory access according to an exemplary embodiment. As shown in FIG. 8, the memory applying module 51 may include: a seventh determining module 81 configured to determine a size of input data of a first convolution operation in the deep learning model; an eighth determining module 82 configured to determine, according to the size of the input data of the first convolution operation, sizes of output data of the N convolution operations and sizes of input data, after being subjected to the value padding, of the N convolution operations; a ninth determining module 83 configured to determine K convolution operation sets according to the sizes of the input data, after being subjected to the value padding, of the N convolution operations, wherein the N convolution operations are composed of the K convolution operation sets, and sizes of input data, after being subjected to the value padding, of convolution operations contained in each convolution operation set are same; a third applying module 84 configured to apply for K memories, wherein the K memories are in one-to-one correspondence to the K convolution operation sets, capacities of the K memories respectively correspond to a size of input data, after being subjected to the value padding, of any convolution operation in the K convolution operation sets, and K is an integer smaller than or equal to N. The learning module 503 is further configured to: prior to performing each convolution operation, perform the value padding on input data of each convolution operation by using each memory corresponding to each convolution operation set to which the each convolution operation belongs.

In the implementation of the device, a plurality of convolution operations with the same size of data after padding may share a memory, thereby saving the memory overhead.

Figure 9:
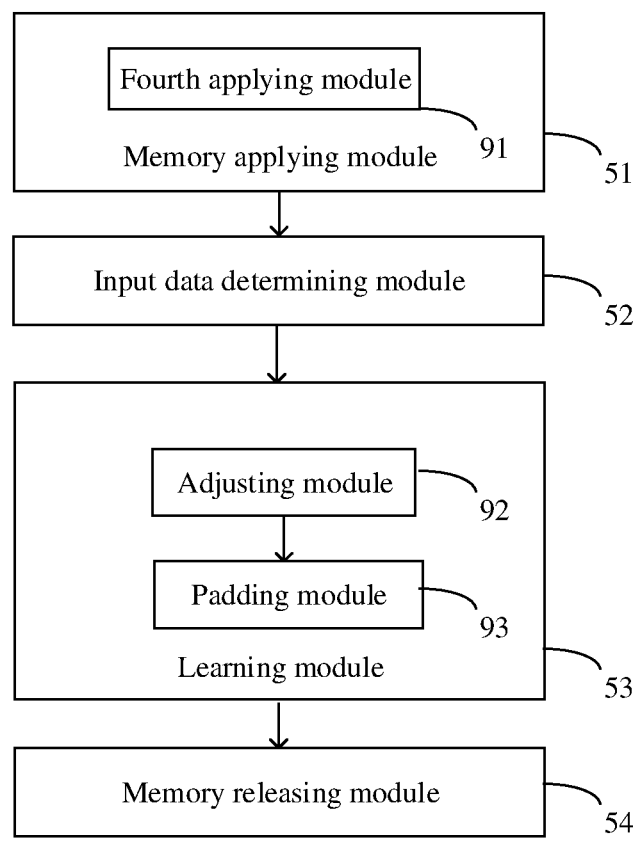
FIG. 9 is a block diagram of a device for processing overhead of memory access according to an exemplary embodiment.

FIG. 9 is a block diagram of a device for processing overhead of memory access according to an exemplary embodiment. As shown in FIG. 9, the memory applying module 51 may include: a fourth applying module 91 configured to apply for a shared memory. The learning module 53 may include: an adjusting module 92 configured to adjust a capacity of the shared memory for a convolution operation requiring the value padding to enable the adjusted capacity of the shared memory to correspond to a size of input data, after being subjected to the value padding, of the convolution operation requiring the value padding; and a padding module 93 configured to perform the value padding on the input data of the convolution operation by using the shared memory.

In the embodiment, during a convolution operation, the shared memory can be dynamically adjusted, that is, the capacity of the shared memory can be adjusted to be increased or reduced, therefore, the memory can be used reasonably according to the use needs, and the memory can be not wasted.

Figure 10:
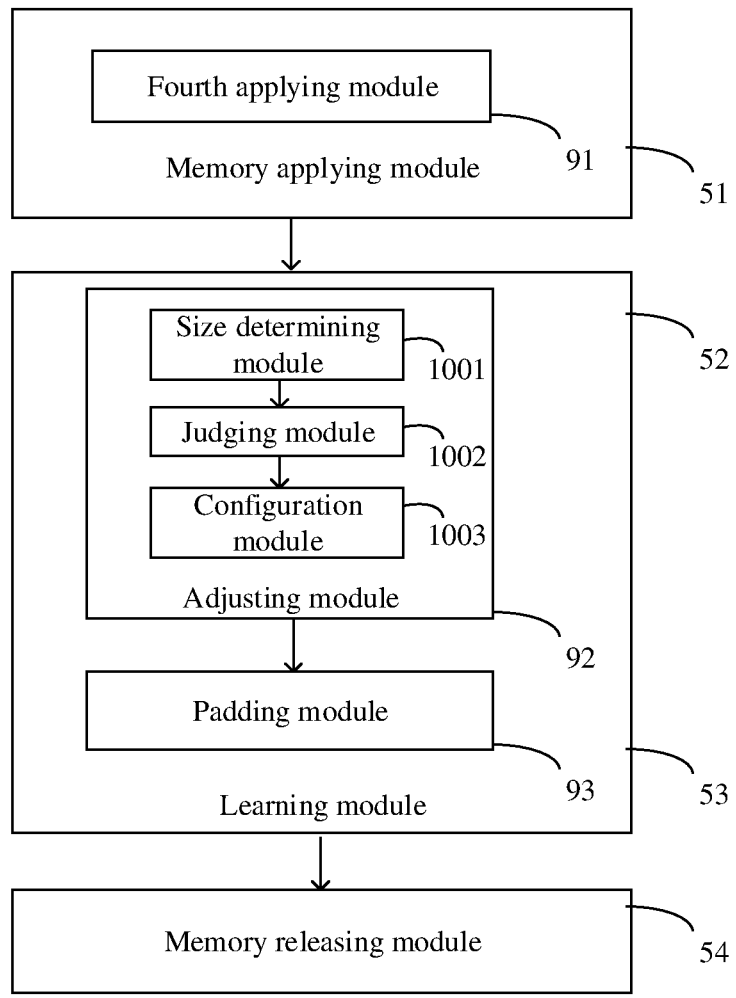
FIG. 10 is a block diagram of a device for processing overhead of memory access according to an exemplary embodiment.

FIG. 10 is a block diagram of a device for processing overhead of memory access according to an exemplary embodiment. On the basis of the device as shown in FIG. 9, the adjusting module 92 may include: a size determining module 1001 configured to, for the convolution operation requiring the value padding, determine the size of the input data, after being subjected to the value padding, of the convolution operation requiring the value padding; a judging module 1002 configured to judge whether a capacity corresponding to the size of the input data of the convolution operation requiring the value padding is greater than the capacity of the shared memory; and a configuration module 1003 configured to, responsive to that the capacity corresponding to the size of the input data of the convolution operation requiring the value padding is greater than the capacity of the shared memory, reconfigure the capacity of the shared memory to be the capacity corresponding to the size of the input data, after being subjected to the value padding, of the convolution operation requiring the value padding.

In the embodiment, during a convolution operation, the shared memory can be dynamically adjusted, but the capacity of the shared memory is adjusted to be increased only when the capacity corresponding to the size of the output data of the convolution operation is greater than the capacity of the shared memory. Compared with the fourth embodiment, this method can reduce the frequency of adjusting the shared memory, thereby saving the processing capability.

Figure 11:
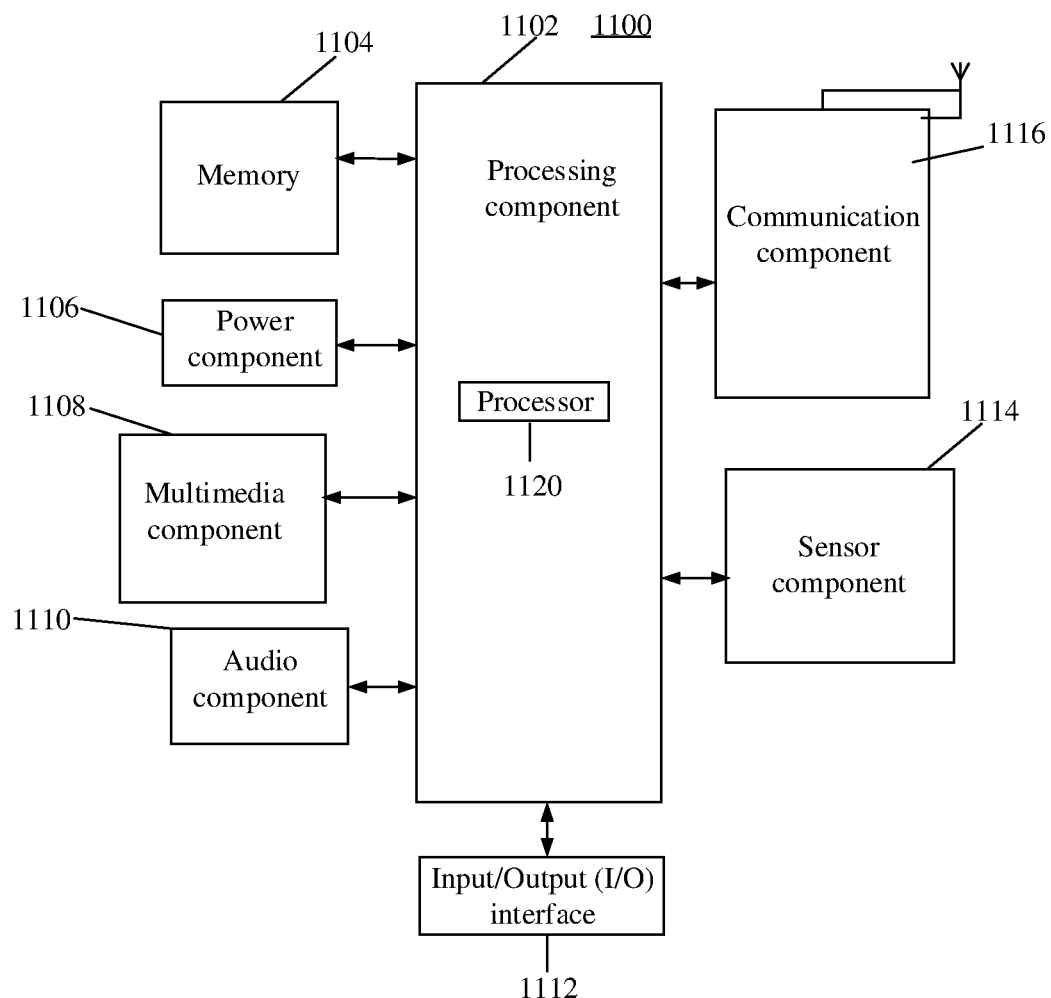
FIG. 11 is a block diagram of a device for processing overhead of memory access according to an exemplary embodiment.

FIG. 11 is a block diagram of a device 1100 for processing overhead of memory access according to an exemplary embodiment. For example, the device 1100 may be a mobile phone, a computer, a digital broadcast terminal, a messaging device, a gaming console, a tablet, a medical device, exercise equipment, a personal digital assistant, and the like.

Referring to FIG. 11, the device 1100 may include one or more of the following components: a processing component 1102, a memory 1104, a power component 1106, a multimedia component 1108, an audio component 1110, an Input/Output (I/O) interface 1112, a sensor component 1114 and a communication component 1116.

The processing component 1102 is typically configured to control overall operations of the device 1100, such as the operations associated with display, telephone calls, data communications, camera operations, and recording operations. The processing component 1102 may include one or more processors 1120 to execute instructions to perform all or part of the operations in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the device 1100. Examples of such data may include instructions for any applications or methods operated on the device 1100, contact data, phone book data, messages, pictures, videos, etc. The memory 1104 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 1106 is configured to provide power to various components of the device 1100. The power component 1106 may include a power management system, one or more power sources, and any other components associated with the generation, management, and distribution of power in the device 1100.

The multimedia component 1108 may include a screen for providing an output interface between the device 1100 and a user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 may include a front camera and/or a rear camera. The front camera and/or the rear camera may receive external multimedia data while the device 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 may include a microphone (MIC) configured to receive an external audio signal when the device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 is configured to provide an interface between the processing component 1102 and peripheral interface modules, such as a keyboard, a click wheel, buttons, and the like. The buttons may include, but are not limited to, a home button, a volume button, a starting button, and a locking button.

The sensor component 1114 may include one or more sensors to provide status assessments of various aspects of the device 1100. For instance, the sensor component 1114 may detect an open/closed status of the device 1100, relative positioning of components, e.g., the display and the keypad, of the device 1100, a change in position of the device 1100 or a component of the device 1100, a presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate wired or wireless communication between the device 1100 and other devices. The device 1100 can access a wireless network based on a communication standard, such as WiFi, 4G, or 5G, or a combination thereof. In one exemplary embodiment, the communication component 1116 receives a broadcast signal or broadcast associated information from an external broadcast management system via a broadcast channel In one exemplary embodiment, the communication component 1116 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the device 1100 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, for performing the above described methods.

In exemplary embodiments, there is also provided a non-transitory computer-readable storage medium including instructions, such as included in the memory 1104, executable by the processor 1120 in the device 1100, for performing the above-described methods. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device, and the like.

Other embodiments of the disclosure will be apparent to those skilled in the art from consideration of the specification and practice of the disclosure here. This application is intended to cover any variations, uses, or adaptations of the disclosure following the general principles thereof and including such departures from the disclosure as come within known or customary practice in the art. It is intended that the specification and embodiments be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for processing overhead of memory access, comprising:
applying for a memory configured to perform value padding on at least one convolution operation in a deep learning model;
determining input data of the deep learning model;
performing deep learning processing on the input data by using the deep learning model; and
releasing the memory after performing the deep learning processing,
wherein the deep learning model comprises N convolution operations which are set in sequence, and N is an integer greater than 1;
the applying for a memory configured to perform value padding on at least one convolution operation in a deep learning model comprises:
determining a size of input data of a first convolution operation in the deep learning model;
determining, according to the size of the input data of the first convolution operation, sizes of output data of the N convolution operations and sizes of input data, after being subjected to the value padding, of the N convolution operations;
determining a maximum size from the sizes of the input data, after being subjected to the value padding, of the N convolution operations; and
applying for N memories, wherein the N memories are in one-to-one correspondence to the N convolution operations, and capacities of the N memories are same and all correspond to the maximum size; and
the performing deep learning processing on the input data by using the deep learning model comprises:
prior to performing each convolution operation, performing the value padding on input data of the convolution operation by using a memory corresponding to the convolution operation, or,
wherein the deep learning model comprises N convolution operations which are set in sequence, and N is an integer greater than 1;
the applying for a memory configured to perform value padding on at least one convolution operation in the deep learning model comprises:
  determining a size of input data of a first convolution operation in the deep learning model;
  determining, according to the size of the input data of the first convolution operation, sizes of output data of the N convolution operations and sizes of input data, after being subjected to the value padding, of the N convolution operations;
  determining K convolution operation sets according to the sizes of the input data, after being subjected to the value padding, of the N convolution operations, wherein the N convolution operations are composed of the K convolution operation sets, and sizes of output data of successive convolution operations contained in each convolution operation set do not increase; and
  applying for K memories, wherein the K memories are in one-to-one correspondence to the K convolution operation sets, capacities of the K memories correspond to sizes of the input data, after being subjected to the value padding, of first convolution operations in the K convolution operation sets, respectively, and K is an integer smaller than N; and
the performing deep learning processing on the input data by using the deep learning model comprises:
  prior to performing each convolution operation, performing the value padding on input data of the convolution operation by using a memory corresponding to the convolution operation set to which the convolution operation belongs,
or,
wherein the deep learning model comprises N convolution operations which are set in sequence, and N is an integer greater than 1;
the applying for a memory configured to perform value padding on at least one convolution operation in the deep learning model comprises:
  determining a size of input data of a first convolution operation in the deep learning model;
  determining, according to the size of the input data of the first convolution operation, sizes of output data of the N convolution operations and sizes of input data, after being subjected to the value padding, of the N convolution operations;
  determining K convolution operation sets according to the sizes of the input data, after being subjected to the value padding, of the N convolution operations, wherein the N convolution operations are composed of the K convolution operation sets, and sizes of input data, after being subjected to the value padding, of convolution operations contained in each convolution operation set are same; and
  applying for K memories, wherein the K memories are in one-to-one correspondence to the K convolution operation sets, capacities of the K memories correspond to sizes of input data, after being subjected to the value padding, of any convolution operations in the K convolution operation sets, respectively, and K is an integer smaller than or equal to N; and
the performing deep learning processing on the input data by using the deep learning model comprises:
  prior to performing each convolution operation, performing the value padding on input data of the convolution operation by using a memory corresponding to the convolution operation set to which the convolution operation belongs,
or,
wherein the applying for a memory configured to perform value padding on at least one convolution operation in the deep learning model comprises:
  applying for a shared memory; and
the performing deep learning processing on the input data by using the deep learning model comprises:
  adjusting a capacity of the shared memory for a convolution operation requiring the value padding to enable the adjusted capacity of the shared memory to correspond to a size of input data, after being subjected to the value padding, of the convolution operation requiring the value padding, and
  performing the value padding on the input data of the convolution operation by using the shared memory.

2. The method of claim 1, wherein the adjusting a capacity of the shared memory for a convolution operation requiring the value padding comprises:
  for the convolution operation requiring the value padding, determining the size of the input data, after being subjected to the value padding, of the convolution operation requiring the value padding; and
  responsive to that a capacity corresponding to the size of the input data, after being subjected to the value padding, of the convolution operation requiring the value padding is greater than the capacity of the shared memory, reconfiguring the capacity of the shared memory to be the capacity corresponding to the size of the input data, after being subjected to the value padding, of the convolution operation requiring the value padding.

3. A device for processing overhead of memory access, comprising:
  a processor; and
  a memory for storing instructions executable by the processor;
  wherein the processor is configured to:
    apply for a memory configured to perform value padding on at least one convolution operation in a deep learning model;
    determine input data of the deep learning model;
    perform deep learning processing on the input data by using the deep learning model; and
    release the memory after performing the deep learning processing,
    wherein the deep learning algorithm comprises N convolution operations with a preset execution sequence, and N is an integer greater than 1; and
  the processor is further configured to:
    determine a size of input data of a first convolution operation in the deep learning model;
    determine, according to the size of the input data of the first convolution operation, sizes of output data of the N convolution operations and sizes of input data, after being subjected to the value padding, of the N convolution operations;
    determine a maximum size from the sizes of the input data, after being subjected to the value padding, of the N convolution operations;
    apply for N memories, wherein the N memories are in one-to-one correspondence to the N convolution operations, and capacities of the N memories are same and all correspond to the maximum size; and prior to performing each convolution operation, perform the value padding on input data of the convolution operation by using a memory corresponding to the convolution operation, or, wherein the deep learning algorithm comprises N convolution operations with a preset execution sequence, and N is an integer greater than 1; and the processor is further configured to:

determine a size of input data of a first convolution operation in the deep learning model;

determine, according to the size of the input data of the first convolution operation, sizes of output data of the N convolution operations and sizes of input data, after being subjected to the value padding, of the N convolution operations;

determine K convolution operation sets according to the sizes of the input data, after being subjected to the value padding, of the N convolution operations, wherein the N convolution operations are composed of the K convolution operation sets, and sizes of output data of successive convolution operations contained in each convolution operation set do not increase;

apply for K memories, wherein the K memories are in one-to-one correspondence to the K convolution operation sets, capacities of the K memories correspond to sizes of the input data, after being subjected to the value padding, of first convolution operations in the K convolution operation sets, respectively, and K is an integer smaller than N; and prior to performing each convolution operation, perform the value padding on input data of the convolution operation by using a memory corresponding to the convolution operation set to which the convolution operation belongs, or, wherein the deep learning algorithm comprises N convolution operations with a preset execution sequence, and N is an integer greater than 1; and the processor is further configured to:

determine a size of input data of a first convolution operation in the deep learning model;

determine, according to the size of the input data of the first convolution operation, sizes of output data of the N convolution operations and sizes of input data, after being subjected to the value padding, of the N convolution operations;

determine K convolution operation sets according to the sizes of the input data, after being subjected to the value padding, of the N convolution operations, wherein the N convolution operations are composed of the K convolution operation sets, and sizes of input data, after being subjected to the value padding, of convolution operations contained in each convolution operation set are same;

apply for K memories, wherein the K memories are in one-to-one correspondence to the K convolution operation sets, capacities of the K memories correspond to sizes of input data, after being subjected to the value padding, of any convolution operations in the K convolution operation sets, respectively, and K is an integer smaller than or equal to N; and prior to performing each convolution operation, perform the value padding on input data of the convolution operation by using a memory corresponding to the convolution operation set to which the convolution operation belongs, or, wherein the processor is further configured to:

apply for a shared memory;

adjust a capacity of the shared memory for a convolution operation requiring the value padding to enable the adjusted capacity of the shared memory to correspond to a size of input data, after being subjected to the value padding, of the convolution operation requiring the value padding; and perform the value padding on the input data of the convolution operation by using the shared memory.

4. The device of claim 3, wherein the processor is further configured to:

for the convolution operation requiring the value padding, determine the size of the input data, after being subjected to the value padding, of the convolution operation requiring the value padding;

judge whether a capacity corresponding to the size of the input data of the convolution operation requiring the value padding is greater than the capacity of the shared memory; and responsive to that the capacity corresponding to the size of the input data of the convolution operation requiring the value padding is greater than the capacity of the shared memory, reconfigure the capacity of the shared memory to be the capacity corresponding to the size of the input data, after being subjected to the value padding, of the convolution operation requiring the value padding.

5. A non-transitory computer-readable storage medium having stored therein instructions that, when executed by a processor of a device, cause the device to execute a method for processing overhead of memory access, the method comprising:

applying for a memory configured to perform value padding on at least one convolution operation in a deep learning model;

determining input data of the deep learning model;

performing deep learning processing on the input data by using the deep learning model; and releasing the memory after performing the deep learning processing, wherein the deep learning model comprises N convolution operations which are set in sequence, and N is an integer greater than 1;

the applying for a memory configured to perform value padding on at least one convolution operation in a deep learning model comprises:

determining a size of input data of a first convolution operation in the deep learning model;

determining, according to the size of the input data of the first convolution operation, sizes of output data of the N convolution operations and sizes of input data, after being subjected to the value padding, of the N convolution operations;

determining a maximum size from the sizes of the input data, after being subjected to the value padding, of the N convolution operations; and applying for N memories, wherein the N memories are in one-to-one correspondence to the N convolution operations, and capacities of the N memories are same and all correspond to the maximum size; and the performing deep learning processing on the input data by using the deep learning model comprises:
prior to performing each convolution operation, performing the value padding on input data of the each convolution operation by using each memory corresponding to the each convolution operation, or, wherein the deep learning model comprises N convolution operations which are set in sequence, and N is an integer greater than 1;

the applying for a memory configured to perform value padding on at least one convolution operation in the deep learning model comprises:
determining a size of input data of a first convolution operation in the deep learning model;
determining, according to the size of the input data of the first convolution operation, sizes of output data of the N convolution operations and sizes of input data, after being subjected to the value padding, of the N convolution operations;
determining K convolution operation sets according to the sizes of the input data, after being subjected to the value padding, of the N convolution operations, wherein the N convolution operations are composed of the K convolution operation sets, and sizes of output data of successive convolution operations contained in each convolution operation set do not increase; and
applying for K memories, wherein the K memories are in one-to-one correspondence to the K convolution operation sets, capacities of the K memories correspond to sizes of the input data, after being subjected to the value padding, of first convolution operations in the K convolution operation sets, respectively, and K is an integer smaller than N; and the performing deep learning processing on the input data by using the deep learning model comprises:
prior to performing each convolution operation, performing the value padding on input data of the convolution operation by using a memory corresponding to the convolution operation set to which the convolution operation belongs, or, wherein the deep learning model comprises N convolution operations which are set in sequence, and N is an integer greater than 1;

the applying for a memory configured to perform value padding on at least one convolution operation in the deep learning model comprises:
determining a size of input data of a first convolution operation in the deep learning model;

determining, according to the size of the input data of the first convolution operation, sizes of output data of the N convolution operations and sizes of input data, after being subjected to the value padding, of the N convolution operations;
determining K convolution operation sets according to the sizes of the input data, after being subjected to the value padding, of the N convolution operations, wherein the N convolution operations are composed of the K convolution operation sets, and sizes of input data, after being subjected to the value padding, of convolution operations contained in each convolution operation set are same; and
applying for K memories, wherein the K memories are in one-to-one correspondence to the K convolution operation sets, capacities of the K memories correspond to sizes of input data, after being subjected to the value padding, of any convolution operations in the K convolution operation sets, respectively, and K is an integer smaller than or equal to N; and the performing deep learning processing on the input data by using the deep learning model comprises:
prior to performing each convolution operation, performing the value padding on input data of the convolution operation by using a memory corresponding to the convolution operation set to which the convolution operation belongs, or, wherein the method further comprises:
applying for a shared memory;
adjusting a capacity of the shared memory for a convolution operation requiring the value padding to enable the adjusted capacity of the shared memory to correspond to a size of input data, after being subjected to the value padding, of the convolution operation requiring the value padding, and
performing the value padding on the input data of the convolution operation by using the shared memory.

6. The non-transitory computer-readable storage medium of claim 5, wherein the method further comprises:
for the convolution operation requiring the value padding, determining the size of the input data, after being subjected to the value padding, of the convolution operation requiring the value padding; and
responsive to that a capacity corresponding to the size of the input data, after being subjected to the value padding, of the convolution operation requiring the value padding is greater than the capacity of the shared memory, reconfiguring the capacity of the shared memory to be the capacity corresponding to the size of the input data, after being subjected to the value padding, of the convolution operation requiring the value padding.

* * * * *